United States Patent [19]

Samson

[11] Patent Number: 4,605,808

[45] Date of Patent: Aug. 12, 1986

[54] CATIONIC POLYMERIZATION OF 1-OLEFINS

[75] Inventor: John N. R. Samson, Stirling, Scotland

[73] Assignee: BP Chemicals Limited, London, England

[21] Appl. No.: 666,567

[22] Filed: Oct. 30, 1984

[30] Foreign Application Priority Data

Nov. 1, 1983 [GB] United Kingdom ............... 8329082

[51] Int. Cl.$^4$ ............................................. C07C 3/18
[52] U.S. Cl. ................................................... 585/525
[58] Field of Search ......................................... 585/525

[56] References Cited

U.S. PATENT DOCUMENTS

| | | |
|---|---|---|
| 2,559,984 | 7/1951 | Montgomery et al. . |
| 2,918,508 | 12/1959 | Coopersmith et al. . |
| 3,024,226 | 3/1962 | Nolan et al. . |
| 3,166,546 | 1/1965 | Nolan et al. . |
| 3,306,907 | 2/1967 | McNinch et al. . |
| 3,346,354 | 10/1967 | Kautsky et al. ...................... 44/63 |
| 3,382,291 | 5/1968 | Brennan ............................ 585/525 |
| 3,634,383 | 1/1972 | Miller . |
| 3,726,842 | 4/1973 | Trieschmann et al. . |
| 3,778,487 | 12/1973 | Driscoll et al. . |
| 3,780,128 | 12/1973 | Shubkin ............................ 585/525 |
| 3,927,041 | 12/1975 | Cengel et al. . |
| 3,935,249 | 1/1976 | Puskas et al. . |
| 4,152,499 | 5/1979 | Boerzel et al. . |
| 4,225,739 | 9/1980 | Nipe et al. ........................ 585/525 |

FOREIGN PATENT DOCUMENTS 1592016  7/1981  United Kingdom .

OTHER PUBLICATIONS

Puskas et al, Journal of Polymer Science, Symposium No. 56, pp. 191-202 (1976).

*Primary Examiner*—Curtis R. Davis
*Attorney, Agent, or Firm*—Brooks Haidt Haffner & Delahunty

[57] ABSTRACT

This invention relates to a process for producing polyisobutene which has at least 70% of its unsaturation in the terminal position. The process uses a complex of boron trifluoride and alcohol as catalyst and a contact time of at least 8 minutes. The feature of the process is its ability to use longer contact times than used hitherto thereby facilitating its commercial operation and improving the control of such an operation. The high terminal unsaturation improves the reactivity of the polymer.

15 Claims, No Drawings

CATIONIC POLYMERIZATION OF 1-OLEFINS

The present invention relates to a process for the cationic polymerisation of 1-olefins, and in particular to producing polyisobutenes which have a relatively high degree of terminal unsaturation.

Isobutene is a typical example of a 1-olefin. Methods of polymerising 1-olefins, e.g. isobutenes whether pure or in an isometric mixture as in a $C_4$ raffinate, using a Friedel-Crafts type catalyst are well-known. Typical of such catalysts are the halides of aluminum, iron, zinc, titanium, tin, mercury and boron. These catalysts have also been used in conjunction with small amounts of co-catalysts such as water, alcohol, sulphur dioxide, carboxylic acids, mineral acids, ethers and alkyl halides to enhance catalyst activity. The reaction has been carried out in the liquid or gaseous phases, batchwise or continuously, at temperatures ranging from $-100°$ to $+100°$ C.

It is also known that the polymerisation of 1-olefins e.g. isobutene using a Friedel-Crafts type catalyst is a cationic process which proceeds through formation of intermediate carbonium ions.

The product of this reaction is generally a mixture of polymers which have the unsaturated linkage in the terminal or internal position within the polymer. Conventional cationic processes generally yield a polymer with a relatively high proportion of internal unsaturation compared with polymers having terminal unsaturation. This is due to the "in situ" isomerisation of the unsaturated linkage to an internal position and is inherent in most cationic polymerisation processes. Internal unsaturation in olefin polymers is believed to be less desirable than terminal unsaturation because of the relatively lower chemical reactivity of internally unsaturated polymers when compared with terminally unsaturated polymers. This is especially true of the reactivity towards compounds such as maleic anhydride which forms an adduct with polyisobutene called polyisobutenyl succinic anhydride (PIBSA). These adducts are most valuable products and form the basis of the lubricating oil additives industry.

Of the cationic polymerisation catalysts used hitherto those containing boron trifluoride are known for their tendency to isomerise the unsaturation in the polymer product to an unreactive internal position. For instance, Puskas, I. et al in Journal of Polymer Science, Symposium No. 56, pp 191-202 (1976) have reviewed the relative effects of catalysts such as boron trifluoride and complexes thereof with cocatalysts such as acetic acid and water. In this article, the authors indicate that up to 40% vinylidene (i.e. terminal) unsaturation can be obtained with a contact time of 5-7 minutes. They conclude however that the longer the contact time the greater is the tendency for the vinylidene unsaturation in the polymer to be isomerised to an unreactive internal position.

This view also appears to be confirmed indirectly in an article by Mullin, M. A. et al in Khim i Tekhnol. Topliv i Masel, vol 10, pp 23-26 (October 1965) in which a complex of boron trifluoride with methanol or a mixture of methanol and ethanol is disclosed as a catalyst for polymerising isobutene. This article discloses a very short contact time of 30-40 seconds which is indicative of the care necessary when using this catalyst.

The criticality of a short contact time in relation to the use of boron trifluoride catalyst for polymerising isobutene is also emphasised in GB No. 1592016 and EP-A-16312. The latter publication advocates vigorous control of contact time and catalyst concentration and stresses the need to have a contact time of below 40 seconds to avoid isomerisation of the double bonds.

It has now been found that a product predominating in terminal unsaturation can be formed by using specific reaction conditions.

Accordingly, the present invention is a liquid phase process for the cationic polymerisation of a feedstock comprising 1-olefins in the presence of a boron trifluoride catalyst at a temperature between $-100°$ and $+50°$ C. characterised in that the catalyst is a preformed complex of boron trifluoride and an alcohol and the contact time of the polymerisation reaction is at least 8 minutes such that at least 70% of the unsaturated linkages in the polymer product are in the terminal position.

The term 'polymerisation' as used herein is intended to cover oligomerisation and the process is particularly suited to the production of oligomers such as dimers and trimers, and low molecular weight polymers of 1-olefins wherein the number average molecular weight (Mn) of the polymer may be from 100 to 15,000.

The hydrocarbon feedstock may be pure 1-olefin or a mixed feed containing the 1-olefin. 1-olefin feedstock containing 4 to 16 carbon atoms is preferred. If a pure olefin is used, which is gaseous under ambient conditions, it is necessary either to control the reaction pressure or to dissolve the olefin in a solvent medium inert under the reaction conditions in order to maintain the olefin in the liquid phase. In the case of isobutene, which is typical of 1-olefins, the feedstock used in the polymerisation process may be pure isobutene or a mixed $C_4$ hydrocarbon feedstock such as that resulting from the thermal or catalytic cracking operation conventionally known as a butadiene raffinate. This is a liquid when under pressure and hence no diluent is needed. The feedstock used may suitably contain between 10 and 100% by weight of isobutene. It is preferable to use a feedstock containing at least 15% by weight of isobutene and most preferably at least 40% by weight of isobutene. The hydrocarbon feedstock used may contain in addition to isobutene between 10 and 20% by weight of butanes and/or between 20 and 40% by weight of normal butenes without adverse effect on the polyisobutene product.

The catalyst is a preformed complex of boron trifluoride and an alcohol. The alcohol suitably contains 1-8 carbon atoms preferably 1-4 carbon atoms. Specific examples of such alcohols include methanol, ethanol, the propanols and the butanols. Of these, a complex between boron trifluoride and ethanol is most preferred.

In the complexes the molar ratio of boron trifluoride to the alcohol is suitably from 0.5:1 to 5:1, preferably from 0.5:1 to 2:1 and most preferably from 0.5:1 to 1:1.

Catalyst complexes with alcohols used in the present invention may be preformed by conventional techniques. For instance to produce a complex of boron trifluoride and ethanol, the boron trifluoride is dissolved in an equimolar proportion of industrial ethanol. The complex so formed is then diluted with a solvent inert under the reaction conditions, e.g. dichloromethane. The solution of the complex so produced is used as the catalyst for the polymerisation reaction.

The polymerisation reaction is carried out in the liquid phase. The preformed catalyst complex is suitably introduced into the polymerisation reactor as a solution thereof in a solvent which is inert under the reaction conditions. The use of a solvent for the catalyst complex is only necessary to ensure a more effective control of the concentration of the catalyst. However, it is possible to use the neat complex of boron trifluoride as such. Examples of suitable solvents include primary and secondary alkyl halides and aliphatic, alicyclic and cycloaliphatic hydrocarbons. Dichloromethane is a typical example of the solvent.

One of the surprising features of the present invention is that in spite of using boron trifluoride as a catalyst component, contact times above 1 minute can be used without risk of any substantial isomerisation of the double bonds in the product. By using a preformed complex of boron trifluoride, contact times in the range 8–70 minutes, preferably 12–20 minutes, can be used without adversely affecting the terminal unsaturation in the polymer. This is a significant feature because it enables more effective control of the reaction parameters and the concentration of the reactants used.

The polymerisation reaction is suitably carried out at a temperature between −50° and +45° C., preferably between −15° and 40° C. The reaction may be carried out at a pressure in the range of 0.4 to 4 bar absolute. The process of the present invention is particularly suitable for producing polyisobutenes having a molecular weight of between 500 and 5000, even more preferably those having a molecular weight of between 750 and 2500. The significantly high proportion of terminal unsaturation in the polymers so produced are particularly suited for producing adducts with maleic anhydride which are eventually converted to the imides by reaction with appropriate amines for use as additives to lubricating oils.

The process of the present invention may be operated batchwise or continuously.

The present invention is further illustrated with reference to the following Examples.

EXAMPLE 1

Feedstock Composition

| Component | % |
|---|---|
| Isobutane | 3.0 |
| n-Butane | 11.0 |
| Butene-1 | 27.9 |
| Isobutene | 38.0 |
| cis-Butene-2 | 11.6 |
| trans-Butene-2 | 8.5 |

Initiator

1:1 molar boron trifluoride: ethanol complex was prepared by dissolution of boron trifluoride in ethanol containing 0.1% water. This initiator was then used diluted in dichloromethane.

Polymerisation Conditions

| | |
|---|---|
| Continuous feedstock addition rate: | 1.1 Kg/hour |
| Continuous initiator addition rate: | 0.019 g mole/Kg feedstock |
| Reaction pressure: | 650 mm Hg |
| Reaction residence time: | 16 minutes |
| Reaction temperature: | −5° C. |
| Reaction poison: | Excess acetonitrile over stoichiometric equivalence of BF$_3$ |
| Monomer Conversion % isobutene: | 87 |

In a continuous process using the feedstock raffinate shown above the catalyst complex solution was metered into the reactor under the condition shown above. After the contact time of 16 minutes the polymerisation reaction was terminated by using an excess of 1% v/v acetonitrile in heptane which was continuously added to the product collection vessels. The monomer conversion was determined by on-line gas chromatography.

The catalyst complex was removed from the polymer/heptane solution by an initial aqueous ammonia wash followed by two water washes. The separated heptane solution was filtered and vacuum distilled.

Polymer Yield

Polymer yield corresponded to 1 tonne per 54 g mole of preformed boron trifluoride-ethanol complex. The total yield was separated into two fractions by vacuum distillation at 200° C./2 mm Hg to give 95% yield of relatively high molecular weight fraction with the remainder comprising predominantly dimer-hexamer oligomer fraction.

Polymer Properties

The product, after removal of light polymer fraction, had a viscosity of 1041 SSU at 98.9° C. (BS188:1957) and a number average molecular weight of 955 determined by vapour pressure osmometry. $^{13}$CNMR analysis of the polymer enabled determination of vinylidene end group structure as 76% of total. This compares favourably with typical 1000 SSU viscosity polyisobutenes commercially available and produced using AlCl$_3$ or Al alkyl chloride based initiators which generally contain less than 10% vinylidene unsaturation.

EXAMPLE 2

The process of Example 1 was repeated using different molar ratios of the boron trifluoride ethanol complex. The reaction conditions used and the results achieved are shown in Table 1 below.

The polymerisation process of Example 1 was repeated using (a) different molar ratios of the boron trifluoride ethanol complex but having a constant boron trifluoride concentration and (b) keeping the grade of the product polymer substantially constant. The reaction conditions used and the results achieved are shown in Table 1.

TABLE 1

Polymer Olefinic Endgroup Structure using Variable BF$_3$.EtOH Composition

| BF$_3$.EtOH Composition | | BF$_3$.EtOH used (as BF$_3$) g mole/ tonne feedstock | % Isobutene Conv. | Polymer Grade ssu × 10$^{-2}$ at 98.89° C. | % Olefinic Endgroup CH$_2$=CRR |
|---|---|---|---|---|---|
| % BF$_3$ by weight | Molar Ratio BF$_3$:EtOH | | | | |
| (a) At Constant BF$_3$ Conc. | | | | | |

TABLE 1-continued
Polymer Olefinic Endgroup Structure using Variable BF$_3$.EtOH Composition

| BF$_3$.EtOH Composition | | BF$_3$.EtOH used (as BF$_3$) g mole/ tonne feedstock | % Isobutene Conv. | Polymer Grade ssu × 10$^{-2}$ at 98.89° C. | % Olefinic Endgroup CH$_2$=CRR |
|---|---|---|---|---|---|
| % BF$_3$ by weight | Molar Ratio BF$_3$:EtOH | | | | |
| 59.5 | 1:1 | | 85 | 10 | 77 |
| 52.5 | 0.75:1 | | 88 | 5 | 80 |
| 49.6 | 0.67:1 | | 67 | 54 | 82 |
| 47.3 | 0.61:1 | ca 20 | 64 | 31 | 83 |
| 46.3 | 0.59:1 | | 55 | 58 | 81 |
| 42.2 | 0.5:1 | | 23 | 82 | 81 |
| (b) At Constant Polymer Grade | | | | | |
| 59.5 | 1:1 | 18.5 | 85 | 10 | 77 |
| 55.3 | 0.91:1 | 20.0 | 89 | 9 | 76 |
| 51.6 | 0.74:1 | 23.0 | 82 | 10 | 84 |
| 51.6 | 0.74:1 | 25.0 | 85 | 9 | 80 |
| 44.6 | 0.55:1 | 33.0 | 71 | 8 | 89 |

Contact time: 15-20 minutes
Reaction temperature: -5° C.

EXAMPLE 3

A batch polymerisation was carried out as in Example 1 using the conditions shown in Table 2 below. The results are also shown in the Table.

TABLE 2
Batch Polymerisation using BDR Feedstock and BF$_3$.EtOH Initiator

| Weight BDR g | Total BF$_3$.EtOH | | Total Polymer Yield g | % Light Polymer | Polymer Grade ssu × 10$^{-2}$ at 98.89° C. | % Olefinic Endgroup CH$_2$=CRR |
|---|---|---|---|---|---|---|
| | ml | g mole/tonne feedstock | | | | |
| 780 | 1.4 | 20.3 | 233.8 | 8.6 | 26 | 71 |

Conditions:
Temperature ca - 4° C.
Reaction Time: 60 minutes 8

EXAMPLE 4

Using the process of Example 1 the reproducibility of the method was tested and compared with a commercial aluminium chloride catalyst. The conditions used and the results achieved are shown in Table 3 below.

TABLE 3
Reproducibility of Polymer Olefinic Endgroup Structure in ca 1000 ssu Viscosity Grades Prepared by use of BF$_3$.EtOH

| | % Olefinic Endgroup ($^{13}$C NMR Analyses) | |
|---|---|---|
| | CH$_2$=CRR | Me$_2$C=CHR |
| Results of Individual BF$_3$EtOH Preparations | 74 | 12 |
| | 77 | 12 |
| | 79 | 9 |
| | 76 | 11 |
| | 77 | 11 |
| | 78 | 11 |
| Average value | 77 | 11 |
| Commercial 1000 SSU × 10$^{-2}$ Polymer | 4 | 0 |

Commercial 1000 SSU × 10$^{-2}$
Polymerisation Temp: ca + 25° C.
Initiator: AlCl$_3$—HCl
Residence Time: ca 30 mins
Conditions BF$_3$.EtOH
Polymerisation Temp.: -5° C.
Residence Time: 15-20 mins
Pressure: 635 mm Hg

EXAMPLE 5

The process of Example 1 was repeated using a mixed isobutane/isobutene feedstock. The conditions used and the results achieved are shown in Table 4 below.

TABLE 4
Polymer Endgroup Structure using Isobutene/Isobutane Feedstock and BF$_3$.EtOH Initiator

| Polymerisation Conditions | | | | |
|---|---|---|---|---|
| Temperature °C. | BF$_3$.EtOH g/mole tonne feedstock | % Convn. Isobutene | Polymer Grade ssu × 10$^{-2}$ at 98.89° C. | % Olefinic Endgroup CH$_2$=CRR |
| -5 | 20 | 97 | 2 | 72 |
| -8 | 12.5 | 88 | 5 | 76 |
| -11 | 12.3 | 73 | 28 | 78 |

Feedstock: 37% Isobutene in Isobutane
Reactor Residence Time: 16 mins

EXAMPLE 6

The process of Example 1 was repeated over varying contact times. The conditions used and results achieved are shown in Table 5 below.

TABLE 5
Effect of Reactor Residence Time upon Polymer Endgroup Structure - Pilot Scale Polymerisation

| Reactor Residence Time (mins) | % Olefinic Endgroup CH$_2$=CRR |
|---|---|
| 16 | 75 |
| 32 | 72 |

TABLE 5-continued

Effect of Reactor Residence Time upon
Polymer Endgroup Structure - Pilot Scale Polymerisation

| Reactor Residence Time (mins) | % Olefinic Endgroup $CH_2=CRR$ |
|---|---|
| 64 | 73 |

Catalyst: $BF_3$.Ethanol
Temperature: $-5°$ C.
Pressure: 635 mm Hg

The above results show that the process is capable of producing polymers with a terminal unsaturation of up to 90%, produces less light polymer, has a tighter molecular weight distribution and uses a more stable catalyst and can operate under milder conditions than used hitherto.

I claim:

1. A liquid phase process for the cationic polymerisation of a feedstock comprising 1-olefins in the presence of boron trifluoride as catalyst at a temperature between $-100°$ and $+50°$ C. characterised in that the catalyst is a preformed complex of boron trifluoride and an alcohol and the contact time of the polymerisation reaction is at least 8 minutes such that at least 70% of the unsaturated linkages in the polymer product are in the terminal position.

2. A process according to claim 1 wherein the hydrocarbon feedstock comprising 1-olefins contains 4 to 16 carbon atoms in the 1-olefin.

3. A process according to claim 1 or 2 wherein the hydrocarbon feedstock is a butadiene raffinate.

4. A process according to claim 3 wherein the hydrocarbon feedstock contains at least 15% by weight of isobutene.

5. A process according to claim 1 wherein the process is carried out under pressure when the hydrocarbon feed is gaseous.

6. A process according to claim 1 wherein the alcohol in the preformed complex catalyst contains from 1 to 8 carbon atoms.

7. A process according to claim 6 wherein the alcohol in the preformed complex catalyst contains 1 to 4 carbon atoms.

8. A process according to claim 7 wherein the alcohol in the preformed complex catalyst is ethanol.

9. A process according to claim 1 wherein the molar ratio of boron trifluoride to the alcohol is from 0.5:1 to 5:1.

10. A process according to claim 1 wherein the contact time is from 8 to 70 minutes.

11. A liquid phase process for the cationic polymerisation of a butadiene raffinate in the presence of boron trifluoride as catalyst at a temperature between $-100°$ and $+50°$ C., characterised in that the catalyst is a preformed complex of boron trifluoride and ethanol wherein the molar ratio of boron trifluoride to ethanol is from 0.5:1 to 1:1, and the contact time of the polymerisation reaction is at least 8 minutes such that at least 70% of the unsaturated linkages in the polymer product are in the terminal position.

12. A process according to claim 11, wherein the butadiene raffinate contains at least 15% by weight of isobutene.

13. A process according to claim 11, wherein the contact time is from 12 to 20 minutes.

14. A process according to claim 11, wherein the butadiene raffinate contains at least 15% by weight of isobutene, from 10% to 20% by weight of butanes, and from 20% to 40% by weight of normal butenes.

15. A process according to claim 1, wherein the molar ratio of boron trifluoride to the alcohol is from 0.5:1 to 1:1.

* * * * *

UNITED STATES PATENT AND TRADEMARK OFFICE
CERTIFICATE OF CORRECTION

PATENT NO. : 4,605,808

DATED : August 12, 1986

INVENTOR(S) : JOHN N.R. SAMSON

It is certified that error appears in the above-identified patent and that said Letters Patent is hereby corrected as shown below:

Cols. 5-6, Table 2, last line of footnotes, after "60 minutes" "8" should be deleted Signed and Sealed this Thirteenth Day of January, 1987

*Attest:*

DONALD J. QUIGG

*Attesting Officer*  *Commissioner of Patents and Trademarks*